(No Model.) 2 Sheets—Sheet 1.

T. J. BROWN.
CULTIVATOR AND COTTON CHOPPER.

No. 340,933. Patented Apr. 27, 1886.

WITNESSES
F. L. Ourand
J. F. Reily

INVENTOR
Thomas J. Brown
By Louis Bagger & Co.
Attorneys.

(No Model.) 2 Sheets—Sheet 2.
T. J. BROWN.
CULTIVATOR AND COTTON CHOPPER.
No. 340,933. Patented Apr. 27, 1886.
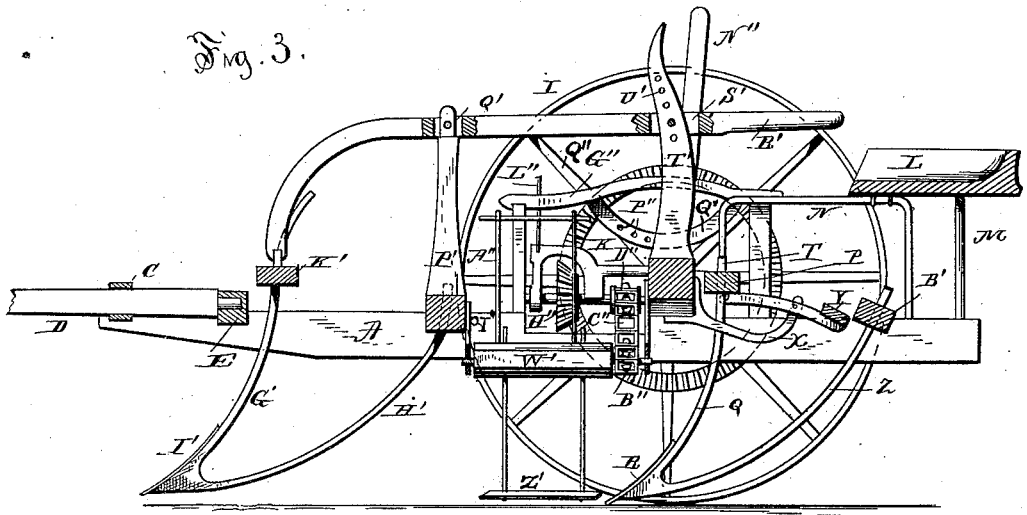
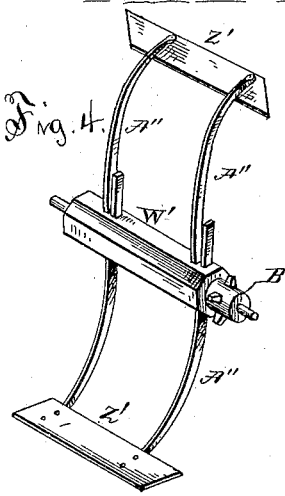
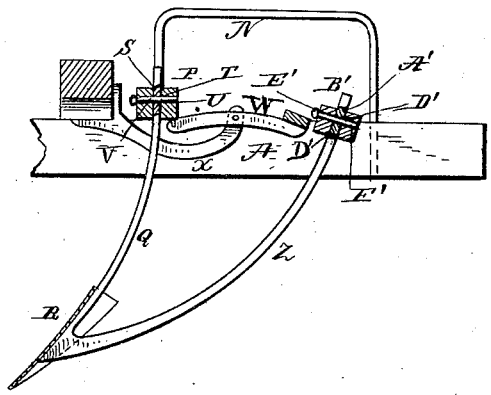
WITNESSES
F. L. Durand
J. F. Reily
INVENTOR
Thomas J. Brown,
By Louis Bagger & Co
Attorneys.

UNITED STATES PATENT OFFICE.

THOMAS JEFFERSON BROWN, OF IOLA, ASSIGNOR OF TWO-THIRDS TO DAVID A. DARBEY, OF DARBY, AND J. B. JAMESON, OF IOLA, TEXAS.

CULTIVATOR AND COTTON-CHOPPER.

SPECIFICATION forming part of Letters Patent No. 340,933, dated April 27, 1886.

Application filed October 12, 1885. Serial No. 179,584. (No model.)

*To all whom it may concern:*

Be it known that I, THOMAS JEFFERSON BROWN, a citizen of the United States, and a resident of Iola, in the county of Grimes and State of Texas, have invented certain new and useful Improvements in Cultivators and Cotton-Choppers; and I do hereby declare that the following is a full, clear, and exact description of the invention, which will enable others skilled in the art to which it appertains to make and use the same, reference being had to the accompanying drawings, which form a part of this specification, and in which—

Figure 1:
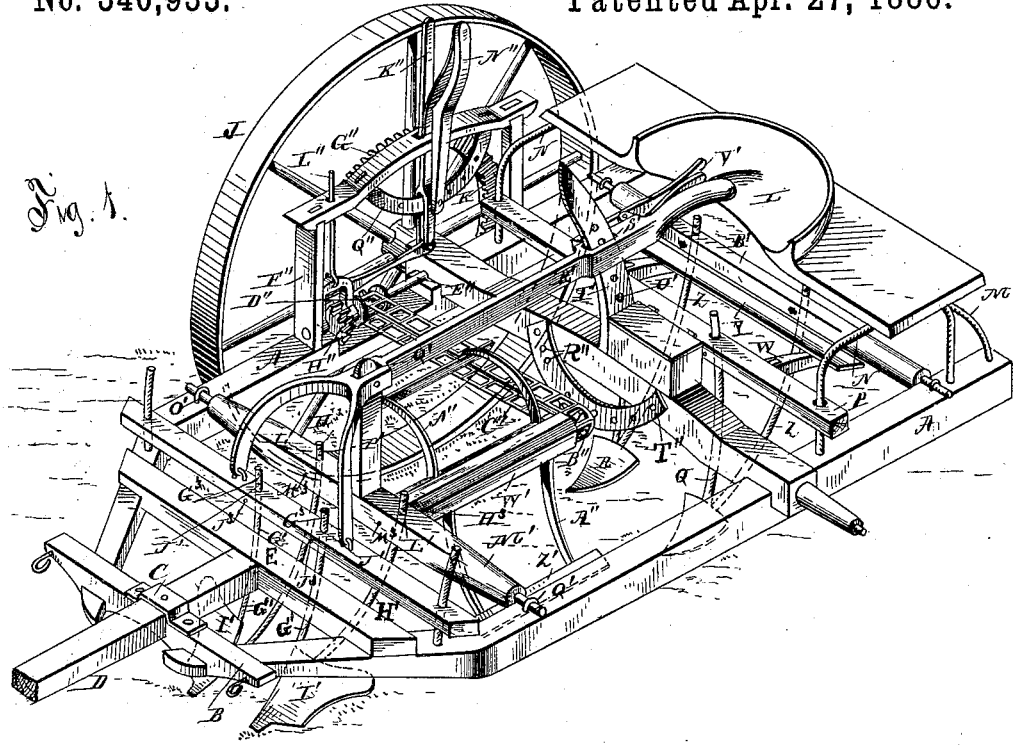
Figure 2:
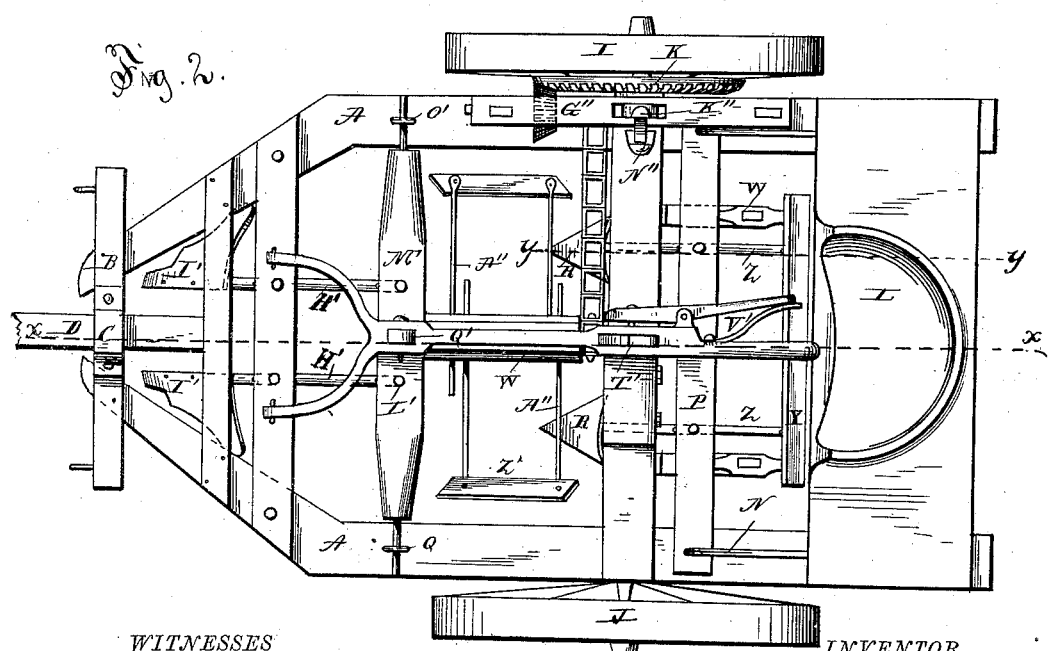

Figure 1 is a perspective view of my improved cultivator and cotton-chopper. Fig. 2 is a top view of the same. Fig. 3 is a longitudinal vertical section of the same, taken on line $x\, x$, Fig. 2 of the drawings. Fig. 4 is a detail view of the mechanism for driving the chopper; and Fig. 5 is a vertical sectional view taken on line $y\, y$, Fig. 2 of the drawings.

Similar letters of reference indicate corresponding parts in all the figures.

My invention has relation to cultivators and cotton-choppers; and it consists in the improved construction and combination of parts of the same, as hereinafter more fully described and claimed.

In the accompanying drawings, the letters A A indicate the side pieces of the frame, which side pieces converge at their forward ends, and are connected by means of a cross-piece, B, which has a strap, C, under which the tongue D is secured, and by a cross-piece, E, which has a socket, F, for the reception of the inner end of the tongue. The axle G is secured upon the side pieces, A A, and has the wheels I and J, the latter of which is provided with a bevel cogged rim, K, secured to the inner sides of the spokes of the wheel.

The seat L, for the driver, is supported at its rear edge upon a rod, M, secured at its ends in the rear ends of the side pieces, and the ends of the seat are supported upon wide bails N N upon the side pieces, the forward ends, O, of which bails are curved segmentally. A bar, P, slides with its perforated ends upon these segmentally-curved ends, and has the upper ends of the standards Q of the rear plows, R, passing through perforations S in it, the said ends of the standards having perforations T, which may be brought to register with perforations U, extending through the bar P transverse to the perforations S, which they intersect, and through which perforations pins V may be inserted, adjusting the standards at different heights.

The standard-supporting bar is pivotally secured to the forward ends of levers W, which are fulcrumed at their middles upon the upwardly-curved ends of brackets X, projecting rearwardly from the axle, and a foot-board, Y, is secured to the rear ends of the levers, being located within convenient reach of the feet of the driver.

S-shaped braces Z project rearwardly and upwardly from the lower ends of the standards of the plows, and the upper ends of these braces pass through perforations A' in a rocking shaft or beam, B', which rocks with its ends in bearings C' upon the side pieces near their rear ends. The said upwardly-curved ends of the braces have perforations D', which may be brought to register with the horizontal perforations E', extending through the beam B', and traversing the perforations A', and pins F' may be inserted through the said perforations, adjusting the braces in the rock-shaft, and thereby adjusting the pitch of the plows. The standards G' and braces H' of the forward plows, I', slide adjustably in a similar manner in perforations J' in a cross-bar, K', and in perforations L' in a rock-shaft, M', the said cross-bar sliding with its perforated ends upon curved guides or uprights N' upon the forward ends of the side pieces, while the rock-shaft rocks with its ends in bearings O' upon the side pieces.

The upwardly-curved ends of the standards G' and braces H' are formed, respectively, with transverse perforations $G^3$ and $H^3$, which may be brought to register with horizontal perforations $J^3$ and $L^3$, intersecting the perforations J' and L', and pins $K^3 M^3$ are inserted through the said perforations, to adjust the said standards G' and braces H' in a manner similar to that in which the standards Q and braces Z are adjusted, as heretofore described.

The rock-shaft has an upright arm, P', upon its middle, which is pivoted in a slot, Q', near the forward bifurcated end of a lever, R', and the cross-bar K' is movably secured to the bifurcated ends of this lever, the said ends being curved downwardly. The rear end of the lever has a slot, S', near the handle, which slot slides upon a segmental upright, T', upon the axle, which segmental upright has a number of perforations, U', which may be engaged by a bolt upon the end of a spring latch-lever, V', which latter is secured upon the rear end of the lever R'. A longitudinal shaft, W', is journaled in vertically-adjustable bearings X' and Y', secured, respectively, upon the forward side of the axle and rear side of the forward rock-shaft, and the shaft is provided with chopping-blades Z', secured to the outer ends of curved arms A" upon the shaft, and with a sprocket-wheel, B", at its rear end. A sprocket-chain, C", passes over this sprocket-wheel and over a sprocket-wheel, D", upon a shaft, E", journaled in longitudinal bearings F" in a frame, G", upon one side piece, and sliding longitudinally in the said bearings. A bevel-pinion, H", is secured upon this shaft near its forward end, and may mesh with the bevel-rim upon the drive-wheel, and a stirrup, I", straddles the said pinion, having its ends in close proximity to the faces of the pinion, and has a rearwardly-extending arm, J", which is pivoted to the lower end of a hand-lever, K", fulcrumed in the upper side of the upright frame. The stirrup is supported by a rod, L", sliding in a vertical perforation, M", in the upper side of the frame, and the ends of the stirrup slide upon the shaft.

The lever K is provided with a latch-lever, N", having a pin, O", engaging perforations P" in a segment, Q", upon the frame G, so that the lever may be tilted, drawing the shaft and pinion to engage the bevel-rim or to be disengaged from it and be secured in its adjusted position. In this manner it will be seen that the forward plows, which may be of any suitable shape, may be raised or lowered by means of the lever, while the plows may be adjusted to travel at any suitable height by means of the pins and perforated upper ends of their standards, and the rear plows may be raised by depressing the foot-board, while they may be adjusted to travel at different heights by means of their standards and braces having perforated upper ends adjustable in the perforations by means of the pins in the cross-bar and rock-shaft.

The choppers may be revolved or retained immovable by means of the sliding shaft carrying the bevel-pinion, so that the machine may cultivate the ground between the rows of cotton-plants, and at the same time chop the row which it straddles, or it may be used simply as a cultivator.

If desired, the plows may be raised and the chopper used alone; or the plows may be removed from the standards and scrapers or so-called "gopher-blades" secured to the standards, all such changes being made in accordance with the work to be performed by the machine, and without having any effect on the general construction or operation of the machine.

The bearings X' and Y' for the chopper-shaft are vertically adjustable upon the rock-shaft and axle, having perforations R", through which the securing-bolts T" are passed into the axle and rock-shaft, so that the said bearings may be raised or lowered at will, causing the choppers to cut less or more into the ground when being revolved.

When the chopper is not to be used, the bearings may be removed from the axle and rock-shaft, and the chopper may then be removed from the frame.

Having thus described my invention, I claim and desire to secure by Letters Patent of the United States—

1. The combination of the rear transverse sliding bar sliding with its perforated ends upon guides upon the frame, the short levers fulcrumed upon the brackets projecting rearwardly from the axle and having the said sliding cross-bar secured to their forward ends, the foot-board secured to the rear ends of the said levers, the rock-shaft rocking with its ends in bearings upon the side pieces of the main frame to the rear of the said sliding bar, and the cultivator-blades having standards secured adjustably in the said sliding cross-bar, and having the curved braces secured adjustably in the rock-shaft, substantially as described, for the purpose set forth.

2. In a combined cultivator and cotton-chopper, the combination of the side pieces of the frame, the bails secured in an upright position upon the side pieces and having curved forward sides, and supporting the seat of the driver at their rear ends, and a cultivator-supporting cross-bar sliding with its perforated ends upon the curved forward sides of the bails and having means for raising it, as and for the purpose shown and set forth.

3. The combination of the forward curved upright guides upon the side pieces of the main frame, the forward transverse sliding bar sliding with its perforated ends upon the said curved uprights, the rock-shaft rocking with its ends in bearings upon the side pieces of the main frame to the rear of the said sliding bar, and provided with the central upwardly-projecting arm, the upright segment having the transverse perforations and secured centrally upon the axle, and the lever having its downwardly-curved bifurcated forward end pivotally secured to the said sliding cross-bar, the said lever being pivoted upon the upper end of the said upright arm of the said rock-shaft and having the slot near its rear end sliding upon the said segment, and having a spring-latch engaging the perforations of the said segment, all constructed and arranged as described, for the purpose set forth.

4. The combination of the main frame having the axle and the forward transverse rock-shaft, the vertically-adjustable bearings secured to the said rock-shaft and axle, the chopper-shaft having the projecting arms carrying the chopper-blades and journaled longitudinally in the said vertically-adjustable bearings, the cogged rim secured upon one of the drive-wheels, the longitudinally-sliding shaft having a pinion meshing with the said cogged rim, and carrying also a sprocket-wheel, means for adjusting the said longitudinally-sliding shaft to throw its pinion into or out of gear with the cogged rim on the drive-wheel, and the endless chain passing around the sprocket-wheel on the longitudinally-sliding shaft and a similar sprocket-wheel on the chopper-shaft, substantially as described.

5. The combination of the main frame having the axle and the forward transverse rock-shaft, the adjustable bearings consisting of the brackets having the vertical series of apertures at their upper ends, the chopper-shaft having its ends journaled in the said vertically-adjustable brackets, the bolts passing through the perforations of the said brackets into the axle and forward rock-shaft, and means, substantially as described, for rotating the chopper-shaft.

In testimony that I claim the foregoing as my own I have hereunto affixed my signature in presence of two witnesses.

THOMAS JEFFERSON BROWN.

Witnesses:
 JONAS LUCAS,
 WALTER HENDERSON.